United States Patent Office 2,736,820
Patented Feb. 28, 1956

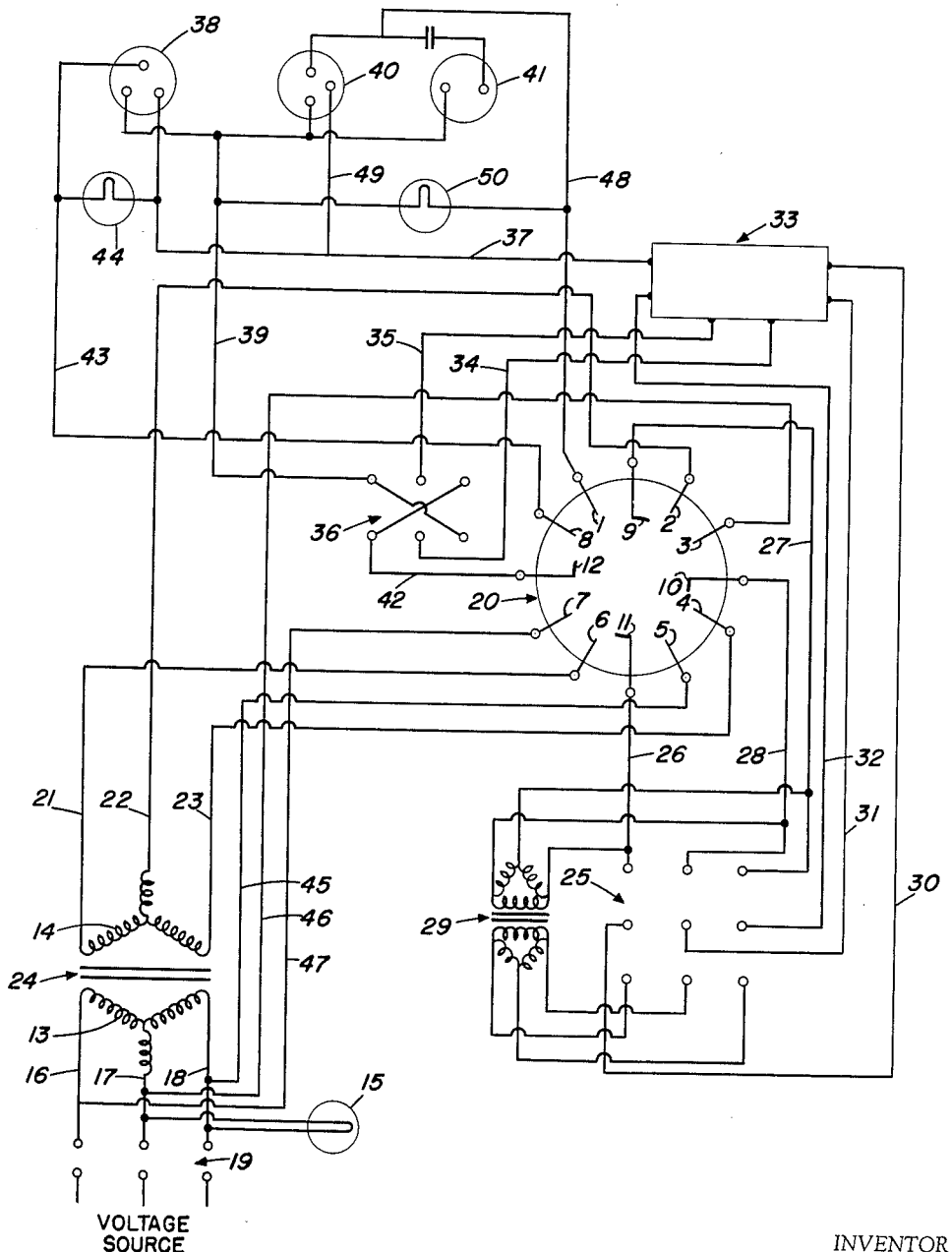

2,736,820
CONTROL PANEL FOR BALANCING ROTORS

Vernon V. Vaughan, Norfolk, Va.

Application August 11, 1953, Serial No. 373,694

4 Claims. (Cl. 307—17)

(Granted under Title 35, U. S. Code (1952), sec. 266)

The invention described herein may be manufactured and used by or for the Government of the United States of America for governmental purposes without the payment of any royalties thereon or therefor.

This invention relates to a control panel for a rotor balancing machine generally known as a "Strobodyne Balancing Machine" which is used for mechanically balancing a plurality of different types of rotors of different sizes. The various types of rotors have different characteristics and are, therefore, rotated by motors having different characteristics in order to obtain optimum balancing. These motors which are used for balancing are both three phase and single phase.

In the mechanical balancing of rotors it is desirable to bring the rotors from rest to an optimum balancing speed in as short a time as possible, and, after desired data as to the point and amount of unbalance has been obtained, to return the rotor to rest as quickly as possible so that it can be taken from the machine. However, because of the different physical characteristics of the rotors to be balanced different types of motors are used for rotating the rotors in order to achieve the aforementioned desired results.

This invention sets forth a control panel which reduces the time required for balancing various rotors and by a novel switching means allows only certain voltages to be obtained from the control panel at any one time.

The control panel and switching arrangement of the instant invention, by means of a transformer, allows the operator to cause the electrical outlets to which the motors are connected to have a voltage which differs from normal operating voltage so that the motors which rotate the rotors can be brought up to speed more quickly and furthermore this transformer can also be used in conjunction with the reversing switch to brake the driving motors when it is desired to stop the latter.

It is still a further object of the instant invention to provide a control panel which utilizes a three phase input to give either a three phase output of voltage substantially equal to the input, a three phase output of voltage different from the input, or a single phase voltage approximately equal to the voltage of the three phase input.

The general objects of this invention are to provide a control panel for a balancing machine which will facilitate the balancing of different types of rotors. The panel and its associated circuit utilizes a three phase source of voltage to give a transformed three phase output or alternatively to give a two phase voltage and three phase voltage both equal to the three phase voltage input. The circuit incorporates a transformer which is used to change the voltage at the outlets of the control panel, when desired, so as to cause various types of motors which are plugged into these outlets of the control panel to either be brought up to speed more rapidly or to be braked more rapidly by the use of the reversing switch in conjunction with this transformer. The circuit also includes a three phase variable transformer which is used for making fine adjustments of the output voltages.

Other objects and many of the attendant advantages of this invention will be readily appreciated as the same becomes better understood by reference to the following detailed description when considered in connection with the accompanying drawing.

Referring to the drawing, there is shown a source of three phase voltage. Numeral 19 designates the main switch to the control panel and numerals 13 and 14 designate the primary and secondary of the three phase transformer 24, respectively. Lines 16, 17, and 18 join the main switch 19 to the primary 13 of the three phase transformer 24. A signal light 15 is connected across lines 17 and 18 to indicate when the main switch connects the voltage source to the transformer primary 13.

Lines 21, 22, and 23 connect the secondary 14 of the three phase transformer 24 to the switch which is generally designated by numeral 20. In the position shown in the drawing contact 9 of the switch 20 is in contact with terminal 2; contact 10 is in contact with terminal 4; contact 11 is in contact with terminal 6; and contact 12 is in contact with terminal 8. It can, therefore, be seen that current flows through leads 21, 22 and 23 to terminals 6, 2, and 4, respectively, of switch 20, then through contacts 11, 9, and 10, of switch 20 to the three pole double-throw switch 25 by way of leads 26, 27, and 28, respectively. Leads 26, 27, and 28 are shunted so that they can also cause current flow to the primary of step-up transformer 29. It can thus be readily seen that the output from switch 25 through lines 30, 31, and 32 can be taken from the primary side of the transformer 29 or from the secondary side by selecting the position of switch 25. The side from which the output is taken depends on whether it is desired to start the motors which are connected to the outlets 38, 40, and 41 of the panel-board or cause them to run at normal speed. This transformer 29 is brought into play by switch 25 and is used to double voltage to the outlets of the control panel when it is desired to quickly accelerate the motor which is connected to the outlet. After the motor has reached operating speed switch 25 is returned to its normal position.

Lines 30, 31, and 32 are connected to the input side of a three phase variable transformer 33, commonly known as a "variac." It has been found in practice that a delta-delta connection for transformer 33 is satisfactory. The output side of transformer 33 is connected by leads 34 and 35 to reversible switch 36 and by lead 37 to output receptacle 38. Lead 39 connects the switch 36 to receptacles 38, 40 and 41. Lead 42 connects reversing switch 36 to contact 12 of switch 20. Contact 12 is in contact with terminal 8, in the position shown on the drawing, and by means of lead 43 which is connected to contact 8, the latter is connected to receptacle 38. Signal light 44 indicates, when lit, that receptacle 38 is energized. Reversing switch 36 is used in conjunction with voltage doubling switch 25 to rapidly decelerate a running motor which is plugged into one of the receptacles. This is accomplished by reversing the position of switch 36, thereby reversing the current to the motor and then doubling the voltage by changing the position of switch 25.

It can be readily seen, therefore, that when switch 20 is in the position shown on the drawing that receptacle 38 is energized and that the voltage at receptacle 38 depends on the ratio of transformer 24, on the position of switch 25, on the adjustment value of the three phase variable transformer 33, and on the position of switch 36. It is to be further noted that receptacles 40 and 44 are not energized when switch 20 is in the position shown.

When it is desired to energize receptacles 40 and 41 switch 20 is changed from the position shown on the drawing, by rotating contacts 9, 10, 11 and 12 clockwise, to a position wherein terminals 9, 10, 11, and 12 are in contact with contacts 3, 5, 7, and 1 respectively. In this position of switch 20 current is drawn from lines 45, 46, and 47 respectively, to terminals 7, 3, and 5 respectively. Since contacts 11, 9, and 10 are respectively connected to contacts 7, 3, and 5, current is then passed through lines 26, 27, and 28 respectively, to switch 25. When the uppermost set of contacts of switch 25 are in contact with the central set of contacts, transformer 29 is not energized. When the lowermost set of contacts of switch 25 are in contact with the central set of contacts, transformer 29 is energized. In either event the lines 30, 31, and 32 pass current to the variable three phase transformer 33. Lines 34 and 35 connect the transformer 33 to reversible switch 36. Line 39 connects the output from the switch 36 to receptacles 40 and 41. Line 42 leads from switch 36 to contact 12 of switch 20 which is in engagement with terminal 1 of switch 20. Current is, therefore, passed from terminal 1, through line 48 to receptacles 40 and 41. Line 37 connects transformer 33 to receptacle 40 by way of line 49. Signal light 50 indicates when receptacles 40 and 41 are energized.

It can readily be seen that when switch 20 is in the position just described that receptacles 40 and 41 are energized but receptacle 38 is not energized. The voltage at these receptacles is dependent only on the position of switch 25 and the adjustment of transformer 33. It can be further seen that the receptacle 40 provides a three phase output and that the receptacle 41 provides a single phase output.

Obviously many modifications and variations of the present invention are possible in the light of the above teachings. It is, therefore, to be understood that within the scope of the appended claims the invention may be practiced otherwise than as specifically described.

Having thus described my invention I claim:

1. A control panel comprising a three phase transformer having a primary winding and a secondary winding; switch means having two sets of input terminals, one set being connected to said primary winding and the other set being connected to said secondary winding; one single phase and two three phase receptacles connected to said switch means, said switch means being operable in one position to energize one three phase receptacle from said secondary winding and operable in another position to energize the single phase receptacle and the other three phase receptacle from said primary winding.

2. A control panel comprising in combination, a three phase transformer having primary and secondary windings, said primary winding having terminals for connection with a three phase source; multiple position contact switch means with one single phase and two sets of three phase input terminals, one set being connected to said primary winding and the other set being connected to said secondary winding, two single phase output terminals and a set of three phase output terminals on said switch, said three phase output terminals being alternatively connectable through said switch means to said primary winding and said secondary winding; a three pole double throw switch having two sets of input terminals and one set of output terminals; one set of said double throw switch input terminals connected to said three phase output terminals; a step-up transformer having a primary winding connected to said three phase output terminals and a secondary winding connected to the other set of said double throw switch input terminals; a three phase variac connected to the last-mentioned switch output terminals and having three output terminals; one single phase and two three phase output receptacles; a reversible switch connected to two output terminals of said variac, the reversible switch having two output terminals one of which is connected to said receptacles and the other of which is connected to said single phase input terminal of said multiple position contact switch; one single phase output terminal of said multiple position contact switch being connected to one three phase receptacle and the other single phase output terminal connected to said single phase receptacle and the other three phase receptacle, the remaining output terminal of said variac being connected to said three phase receptacles whereby a three phase voltage of one magnitude can be obtained from one three phase receptacle for one alternative connection of said multiple position contact switch means and a three phase voltage and a single phase voltage of a different magnitude can be obtained from the other alternative connection of said multiple position contact switch means.

3. A control panel comprising in combination, a three phase source of voltage, a three phase transformer having primary and secondary windings, said primary windings being connected to said voltage source, switch means, said switch means being operatively connected to said primary and secondary sides of said transformer, a plurality of three phase and single phase and single phase output receptacles in said control panel, said switch means in one position connecting the primary sides of said transformer to certain of said receptacles, and in another position connecting the secondary side of said transformers to other of said receptacles, and a three phase variable transformer connected between said switch means and said output receptacles whereby the voltage of said output receptacles may be varied, additional switching means and a third transformer operatively connected to said output receptacles whereby the voltage at the output receptacles may be changed by manipulating the additional switching means thereby utilizing said third transformer.

4. A control panel as set forth in claim 3 which has a reversible switch operatively connected to said additional switching means for reversing the flow of current to said output receptacles.

References Cited in the file of this patent

UNITED STATES PATENTS

| Re. 23,797 | Miller | Mar. 9, 1954 |
| 1,260,354 | Fischer et al. | Mar. 26, 1918 |
| 2,025,233 | Durbin | Dec. 24, 1935 |
| 2,102,887 | Cornell et al. | Dec. 21, 1937 |